(12) United States Patent
Yuge

(10) Patent No.: US 9,886,043 B2
(45) Date of Patent: Feb. 6, 2018

(54) HOT-WATER SUPPLY SYSTEM

(71) Applicant: RINNAI CORPORATION, Nagoya-shi, Aichi (JP)

(72) Inventor: Ryosuke Yuge, Aichi (JP)

(73) Assignee: RINNAI CORPORATION, Nagoya-Shi (JP)

( * ) Notice: Subject to any disclaimer, the term of this patent is extended or adjusted under 35 U.S.C. 154(b) by 26 days.

(21) Appl. No.: 14/966,200

(22) Filed: Dec. 11, 2015

(65) Prior Publication Data
US 2016/0186415 A1    Jun. 30, 2016

(30) Foreign Application Priority Data

Dec. 26, 2014 (JP) .................. 2014-264976

(51) Int. Cl.
| | | |
|---|---|---|
| *F24D 17/00* | (2006.01) | |
| *G05D 23/19* | (2006.01) | |
| *F24D 19/10* | (2006.01) | |

(52) U.S. Cl.
CPC ..... *G05D 23/1919* (2013.01); *F24D 17/0026* (2013.01); *F24D 17/0078* (2013.01); *F24D 19/1051* (2013.01); *Y10T 137/6497* (2015.04); *Y10T 137/86171* (2015.04)

(58) Field of Classification Search
CPC ........... F24D 17/0078; Y10T 137/6497; Y10T 137/86171
See application file for complete search history.

(56) References Cited

U.S. PATENT DOCUMENTS

| | | | | |
|---|---|---|---|---|
| 4,750,472 A | * | 6/1988 | Fazekas | F24D 19/1051 122/13.3 |
| 5,829,467 A | * | 11/1998 | Spicher | F24D 17/0078 137/14 |
| 6,453,938 B1 | * | 9/2002 | Ebster | C02F 1/02 137/337 |
| 6,920,897 B2 | * | 7/2005 | Poirier | E03B 7/04 137/561 A |
| 7,036,520 B2 | * | 5/2006 | Pearson, Jr. | F24D 17/0078 126/362.1 |
| 7,773,868 B2 | * | 8/2010 | Moore | F24D 17/0078 122/14.3 |
| 2009/0145490 A1 | * | 6/2009 | Kershisnik | E03B 7/04 137/334 |

(Continued)

FOREIGN PATENT DOCUMENTS

| | | |
|---|---|---|
| JP | 8-121800 | 5/1996 |
| JP | 11-121800 | 4/1999 |

*Primary Examiner* — Kevin Murphy
(74) *Attorney, Agent, or Firm* — Rankin, Hill & Clark LLP

(57) ABSTRACT

A hot-water supply system 1 comprises a temperature responsive valve 61 provided in a first bypass passage 60, an orifice 31 provided in a second bypass passage 30, a flow rate sensor 24 provided in a water supply passage 11 downstream from a connection point with the second bypass passage 30, a circulating pump 33 provided in the water supply passage 11 downstream from the connection point with the second bypass passage 30, and a controller 4. The controller 40 operates the circulating pump 33 and executes circulation heating operation for operating a burner to heat the hot water circulating through a circulation circuit 80, when a flow rate detected by the flow rate sensor 24 is equal to or more than a specified flow rate.

7 Claims, 2 Drawing Sheets

(56) References Cited

U.S. PATENT DOCUMENTS

2010/0096018 A1\* 4/2010 Wylie ................. F24D 17/0078
137/2
2010/0126604 A1\* 5/2010 Lund .................. F24D 17/0078
137/565.01

\* cited by examiner

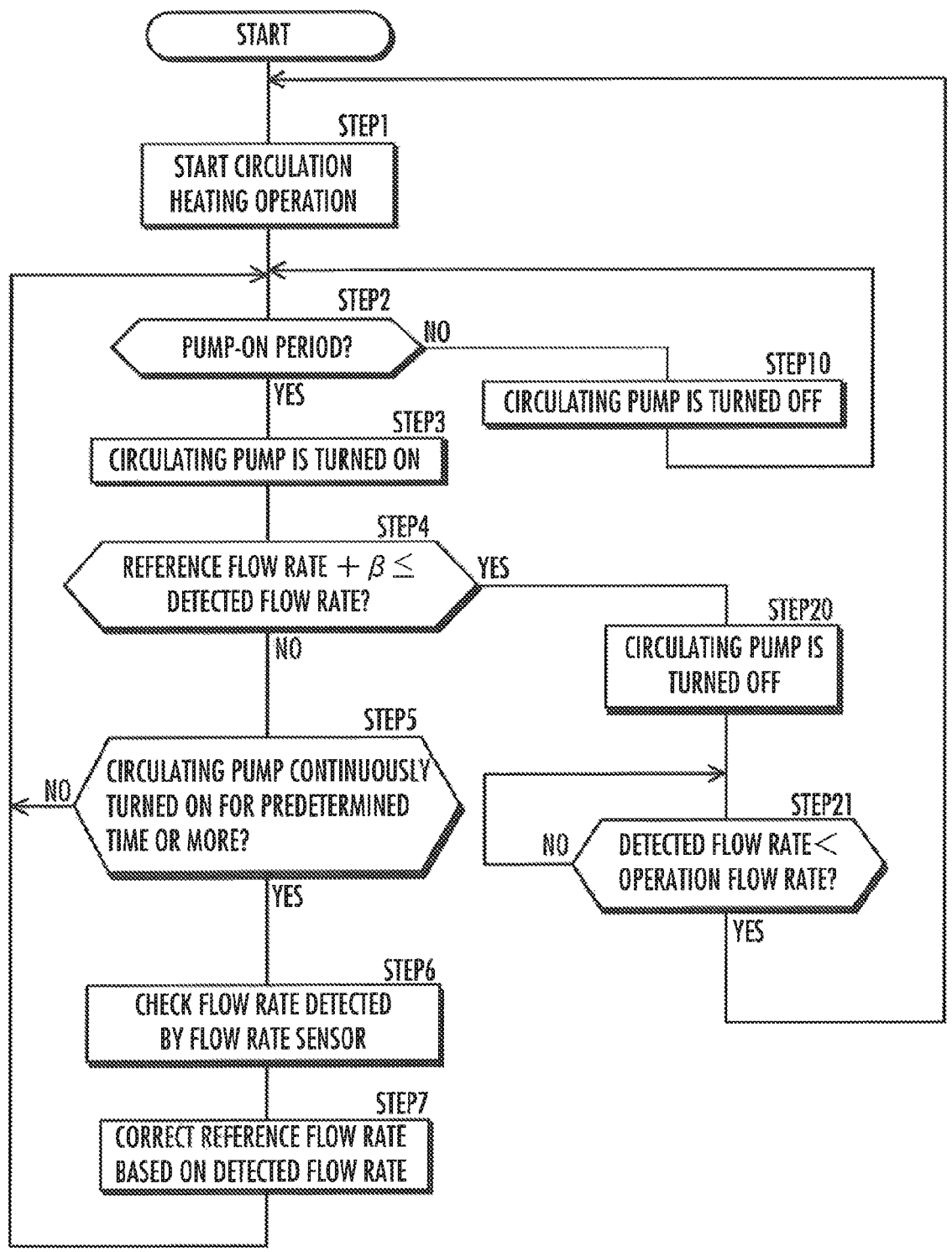

HOT-WATER SUPPLY SYSTEM

BACKGROUND OF THE INVENTION

Field of the Invention

The present invention relates to a hot-water supply system comprising an instantaneous hot-water supply function.

Description of the Related Art

A hot-water supply system has conventionally been proposed which includes a hot water circulation circuit formed between a hot-water supplier and a mixing faucet to achieve an instantaneous hot-water supply function (for example, see Japanese Patent Laid-Open No. 8-121800 (hereinafter referred to as Patent Document 1)). In this hot-water supply system, the hot water circulation circuit is constituted by providing a bypass passage that bypasses the mixing faucet by making a water outlet passage and a hot-water outlet passage communicate with each other, the water outlet passage being branched from a water supply passage that supplies water to the hot-water supplier and being connected to a water side connection port of the mixing faucet, the hot-water outlet passage being configured to feed hot water from the hot-water supplier.

According to the configuration of the hot water supply system disclosed in Patent Document 1, it is not necessary to provide an exclusive return passage that connects a hot-water side connection port of the mixing faucet to the water supply passage of the hot-water supplier. Accordingly, construction can easily be conducted and cost of the hot-water supply system can be reduced.

In the hot-water supply system disclosed in Patent Document 1, the bypass passage bypassing the mixing faucet is equipped with a check valve configured to block water flow from the water outlet passage side to the hot-water outlet passage side, and a temperature responsive valve configured to be closed when hot-water temperature inside the bypass passage is equal to or more than a prescribed temperature.

The hot-water supply system disclosed in Patent Document 1 executes circulation heating operation to heat hot water inside the circulation circuit, which is constituted of the water supply passage, the water outlet passage, the hot-water supplier, the hot-water outlet passage, and the bypass passage, by operating a circulating pump to circulate hot water through the circulation circuit, while operating a burner in the hot-water supplier to heat a heat exchanger communicating with the water supply passage and the hot-water outlet passage.

When high-temperature hot water is fed from the hot-water supplier while the circulation heating operation is performed, the temperature responsive valve is closed and circulation of hot water in the circulation circuit is stopped, so that the high-temperature hot water is prevented from flowing to the water outlet passage side through the bypass passage. This prevents discharge of the high-temperature hot water which has flown to the water outlet passage-side, when a user opens the mixing faucet.

In the hot-water supply system disclosed in Patent Document 1, the temperature responsive valve provided in the bypass passage is closed when high-temperature hot water is fed to the hot-water outlet passage from the hot-water supplier while the circulation heating operation is performed. However, it takes a certain time for the temperature responsive valve to shift from an opened state to a closed state.

It is therefore difficult to perfectly prevent the high-temperature hot water from flowing into the water outlet passage-side during a period until the temperature responsive valve is closed after the high-temperature hot water starts to flow into the bypass passage from the hot-water outlet passage.

To overcome this difficulty, it can be considered to limit the flow rate of the hot water circulating through the circulation circuit during circulation heating operation to decrease the amount of the high-temperature hot water flowing into the water outlet passage side at the time when the temperature responsive valve is being closed. However, when the flow rate of the hot water circulating through the circulation circuit becomes less than a specified flow rate which is an operating condition of the burner, the burner fails to operate and therefore the circulation heating operation cannot be carried out.

SUMMARY OF THE INVENTION

The present invention has been made in view of the above-stated background, and it is therefore an object of the present invention to provide a hot-water supply system capable of decreasing the amount of high-temperature hot water that flows from the bypass passage into the water outlet passage side and ensuring circulation of hot water of a specified flow rate or more provided by operation of the burner when the circulation heating operation is executed.

The hot-water supply system of the present invention is a hot-water supply system including a hot-water supplier having a burner and a heat exchanger heated by the burner to instantaneously supply hot water from the hot-water supplier to a mixing faucet, the system comprising: a water supply passage configured to make a water supply system communicate with an inlet of the heat exchanger; a hot-water outlet passage configured to make an outlet of the heat exchanger communicate with a hot-water side connection port of the mixing faucet; a water outlet passage connected to the water supply passage and communicating with a water side connection port of the mixing faucet; a first bypass passage configured to bypass the mixing faucet to make the hot-water outlet passage communicate with the water outlet passage; a temperature responsive valve provided in the first bypass passage and configured to be closed to block the first bypass passage when temperature of hot water inside the first bypass passage is equal to or more than a prescribed temperature; a second bypass passage configured to make a downstream point of the water supply passage communicate with an upstream point of the hot-water outlet passage, the downstream point being downstream from a branch point branching to the water outlet passage, the upstream point being upstream from a connection point with the first bypass passage; a bypass check valve provided in the second bypass passage and configured to enable hot water to circulate from the hot-water outlet passage side to the water supply passage side while disabling the hot water from circulating from the water supply passage side to the hot-water outlet passage side; a flow rate limiting portion provided in the second bypass passage and configured to limit a flow rate of the hot water circulating through the second bypass passage; a circulating pump provided in the water supply passage downstream from a connection point with the second bypass passage or in the hot-water outlet passage upstream from a connection point with the second bypass passage and configured to circulate the hot water inside a circulation circuit including at least the water supply passage, the heat exchanger, the hot-water outlet passage, the first bypass passage, the second bypass passage, the water outlet passage, and the water supply passage; a flow rate detector configured to detect a flow rate of hot water flowing through the water supply passage downstream from the connection point with the second bypass passage; and a control unit configured to perform circulation heating operation for heating the hot water circulating through the circulation circuit by operating the circulating pump and also operating the burner when the flow rate detected by the flow rate detector is equal to or more than a specified flow rate.

According to the present invention, the hot water supplied from the hot-water supplier to the hot-water outlet passage when the circulation heating operation is executed joins the water supply passage via the first bypass passage and the second bypass passage. Accordingly, the flow rate of the hot water flowing to the first bypass passage side can easily be decreased by regulating the flow rate limited by the flow rate limiting portion provided in the second bypass passage. This makes it possible to decrease the amount of high-temperature hot water which flows from the first bypass passage to the water outlet passage during a period until the temperature responsive valve is closed after the hot water at the prescribed temperature or more circulates to the first bypass passage from the hot-water outlet passage.

Moreover, the flow rate detector detects the flow rate of the hot water flowing through the water supply passage downstream from the connection point with the second bypass passage. Accordingly, when the circulation heating operation is performed, the total flow rate of the hot water circulating through the first bypass passage and the hot water circulating through the second bypass passage is detected by the flow rate detector. This makes it possible to decrease the flow rate of the hot water in the first bypass passage and to maintain the flow rate detected by the flow rate detector to be equal to or more than the specified flow rate that enables the burner to work.

The hot-water supply system further comprises: a pump bypass passage configured to make a water inlet and a water outlet of the circulating pump communicate with each other; and a pump check valve provided in the pump bypass passage and configured to enable hot water to circulate from the water inlet side to the water outlet side of the pump while disabling the hot water from circulating from the water outlet side to the water inlet side of the pump, wherein when the flow rate detected by the flow rate detector is equal to or more than the specified flow rate while the circulation heating operation is stopped and the operation of the circulating pump is stopped, the control unit performs hot-water supply operation for operating the burner to heat water by the hot-water supplier supplied to the water supply passage from the water supply system and supplying obtained hot water to the mixing faucet through the hot-water outlet passage.

According to this configuration, when the mixing faucet is opened and water is supplied from the water supply system to the water supply passage while the circulation heating operation is stopped, and when the control unit is executing the hot-water supply operation, the water supplied to the water supply passage can be circulated from the heat exchanger to the hot-water outlet passage via the pump bypass passage side without going through the circulating pump. Therefore, it becomes possible to avoid decrease in the flow rate of the hot water supplied to the hot-water outlet caused by circulation resistance of the circulating pump.

BRIEF DESCRIPTION OF THE DRAWINGS

FIG. 2 is a flow chart illustrating operation in an instantaneous hot-water supply mode.

DETAILED DESCRIPTION OF THE PREFERRED EMBODIMENTS

Figure 1:
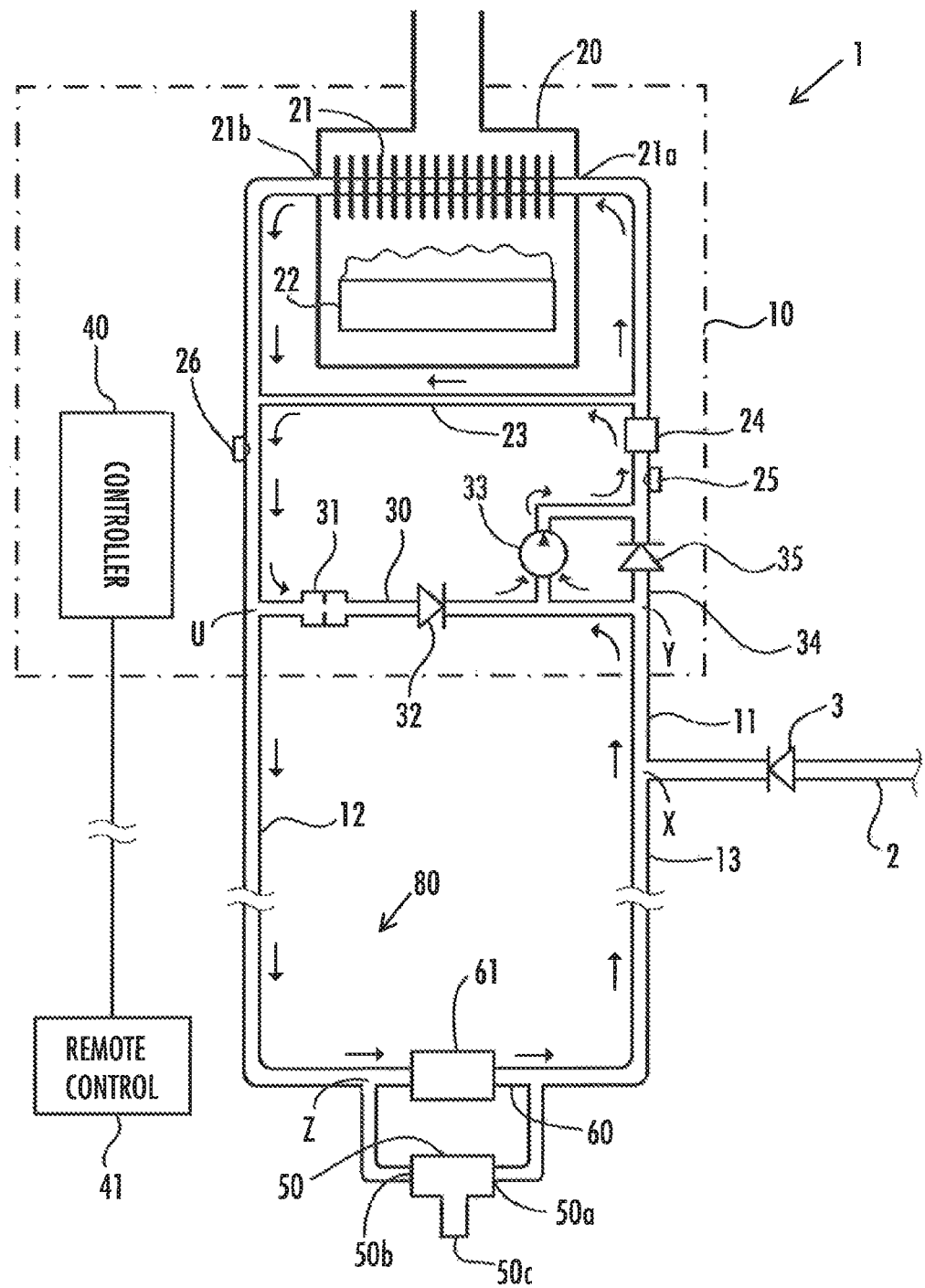
FIG. 1 is a block diagram illustrating a hot-water supply system of the present embodiment.

An embodiment of a hot-water supply system of the present invention will be described with reference to FIGS. 1 to 2.

With reference to FIG. 1, a hot-water supply system 1 of the present embodiment comprises: a hot-water supplier 10; a water supply passage 11 connected to a water supply system 2 and configured to supply water to the hot-water supplier 10; a water outlet passage 13 connected to the water supply passage 11 and communicating with a water side connection port 50a of a mixing faucet 50; a hot-water outlet passage 12 communicating with a hot-water side connection port 50b of the mixing faucet 50 to supply hot water from the hot-water supplier 10, a first bypass passage 60 bypassing the mixing faucet 50 and making the water outlet passage 13 communicate with the hot-water outlet passage 12 in the vicinity of the mixing faucet 50; and a temperature responsive valve 61 provided in the first bypass passage 60 and configured to be closed to block the first bypass passage 60 when the temperature of hot water inside the first bypass passage 60 becomes equal to or more than a prescribed temperature (for example, 37 degrees).

The temperature responsive valve 61 incorporates a check valve configured to enable hot water to circulate from the hot-water outlet passage 12 side to the water supply passage 11 side while disabling the hot water from circulating from the water supply passage 11 side to the hot-water outlet passage 12 side.

The hot-water supplier 10 comprise: a heat exchanger 21 placed inside a combustion casing 20, with an inlet 21a being connected to the water supply passage 11 and an outlet 21b being connected to the hot-water outlet passage 12; a burner 22 (such as a gas burner and an oil burner) placed under the heat exchanger 21 inside the combustion casing 20 and configured to heat the heat exchanger 21; a hot-water supply bypass passage 23 bypassing the heat exchanger 21 and making the water supply passage 11 communicate with the hot-water outlet passage 12; and a second bypass passage 30 configured to make a point Y of the water supply passage 11 communicate with a point U of the hot-water outlet passage 12, the point Y being downstream from a branch point X branching with the water outlet passage 13, the point U being upstream from a connection point Z with the first bypass passage 60.

The water supply passage 11 is equipped with a circulating pump 33 configured to circulate hot water inside a circulation circuit 80 that includes the heat exchanger 21, the hot-water supply bypass passage 23, the hot-water outlet passage 12, the first bypass passage 60, the second bypass passage 30, and the water outlet passage 13. The water supply passage 11 is also equipped with a flow rate sensor 24 (equivalent to the flow rate detector of the present invention) configured to detect the flow rate of the hot water flowing in the water supply passage 11 downstream from a connection point with the second bypass passage 30, and a supplied water temperature sensor 25 configured to detect the temperature of the hot water supplied from the water supply passage 11 to the heat exchanger 21.

The circulating pump 33 is configured to suck hot water from the hot-water outlet passage 12 via the second bypass passage 30, to suck hot water from the hot-water outlet passage 12 via the first bypass passage 60 and the water outlet passage 13, and to deliver the sucked hot water from the water supply passage 11 to the heat exchanger 21 and to the hot-water supply bypass passage 23 as illustrated by arrows. As a result, the hot water circulates by a route of the circulating pump 33 the water supply passage 11 the heat exchanger 21, the hot-water supply bypass passage 23 the hot-water outlet passage 12 the first bypass passage 60, and the second bypass passage 30 the circulating pump 33.

The hot-water outlet passage 12 is equipped with a hot-water outlet temperature sensor 26 configured to detect the temperature of the hot water flowing through a portion of the hot-water outlet passage 12 downstream from the connection point with the hot-water supply bypass passage 23. The second bypass passage 30 is equipped with an orifice 31 (equivalent to the flow rate limiting portion of the present invention) configured to limit the flow rate of the hot water circulating through the second bypass passage 30, and a bypass check valve 32 configured to enable hot water to circulate from the hot-water outlet passage 12 side to the water supply passage 11 side while disabling the hot water from circulating from the water supply passage 11 side to the hot-water outlet passage 12 side.

The hot-water supplier 10 comprises a pump bypass passage 34 bypassing the circulating pump 33 and communicating with the water supply passage 11. The pump bypass passage 34 is equipped with a pump check valve 35 configured to enable hot water to circulate from a water inlet side to a water outlet side of the circulating pump 33 while disabling the hot water from circulating from the water outlet side to the water inlet side of the circulating pump 33.

The hot-water supplier 10 further comprises a controller 40 (including the function of the control unit of the present invention) configured to control the overall operation of the hot-water supply system 1. The controller 40 is connected to a remote control 41 configured to operate the hot-water supplier 10 by remote control.

The controller 40 is an electronic circuit unit constituted of such components as a CPU, a memory, and various interface circuits which are not illustrated. A control program of the hot-water supply system 1 is stored in the memory and is executed by the CPU to serve the function to control the operation of the hot-water supply system 1.

The controller 40 receives signals such as temperature detection signals of the supplied water temperature sensor 25 and the hot-water outlet temperature sensor 26, a flow rate detection signal of the flow rate sensor 24, and a manipulate signal of the remote control 41. The operation of the component elements, such as the burner 22, the circulating pump 33, and a display portion of the remote control 41, is controlled by the control signals output from the controller 40.

The user can set and cancel the instantaneous hot-water supply mode by operating the remote control 41. The controller 40 of the hot-water supply system 1 monitors the flow rate detected by the flow rate sensor 24. When the flow rate detected by the flow rate sensor 24 is equal to or more than an operation flow rate (equivalent to the specified flow rate of the present invention, e.g., 2.7 liters per minute), the controller 40 performs hot-water supply operation by regulating the combustion amount of the burner 22 so that the hot water at a hot-water preset temperature (set with the remote control 41) is supplied from the hot-water outlet passage 12 to the mixing faucet 50 based on the flow rate detected by the flow rate sensor 24, the temperature detected by the supplied water temperature sensor 25, and the temperature detected by the hot-water outlet temperature sensor 26.

When hot water is supplied to the water supply passage 11, the temperature of the hot water is detected by the supplied water temperature sensor 25. If the temperature is equal to or more than a value of the hot-water preset temperature+α, the controller 40 sets the combustion amount of the burner 22 to zero (combustion stopped state).

When the hot-water supply operation is executed (the circulating pump 33 is in OFF state), the water supplied from the water supply system 2 to the water supply passage 11 circulates not to the circulating pump 33 side having a relatively high circulation resistance but to the pump bypass passage 34 side having a low circulation resistance. This makes it possible to avoid decrease in the flow rate of the hot water supplied to the hot-water outlet passage 12.

When the instantaneous hot-water supply mode is set, the controller 40 executes processing to retain heat of the hot water inside the circulation circuit 80 so that the hot water is swiftly supplied to the mixing faucet 50 when the mixing faucet 50 is opened.

Hereinafter, the processing executed by the controller 40 in the instantaneous hot-water supply mode will be described based on the flow chart illustrated in FIG. 2.

In STEP 1 of FIG. 2, the controller 40 starts circulation heating operation by operating the burner 22 while operating the circulating pump 33 to heat the hot water inside the circulation circuit 80. The controller 40 determines an ON period of the circulating pump 33 (a period for turning on (operating) the circulating pump 33) and an OFF period (a period for turning off (stopping) the circulating pump 33) in accordance with the length of the circulation circuit 80 (pipe length) and the presence of mounting of a heat insulator on the circulation circuit 80 based on the following table 1.

TABLE 1

|  | Pump-ON period | Pump-OFF period |
| --- | --- | --- |
| Pipe length: short | 8 minutes | — |
| Pipe length: long | 16 minutes | — |
| Heat insulator: not mounted | — | 4 minutes |
| Heat insulator: mounted | — | 8 minutes |

The controller 40 alternately repeats the pump-ON period and the pump-OFF period in sequence. During the pump-ON period, the controller 40 operates the burner 22 to heat the hot water inside the circulation circuit 80 when the temperature detected by the hot-water outlet temperature sensor 26 becomes equal to or less than a value of a prescribed heat-retention temperature−α. When the temperature detected by the hot-water outlet temperature sensor 26 becomes equal to or more than a value of the heat-retention temperature+α, the controller 40 turns off the burner 22. In this case, the controller 40 operates the burner 22 on condition that the flow rate detected by the flow rate sensor 24 is equal to or more than the operation flow rate (equivalent to the specified flow rate of the present invention).

In subsequent STEP 2, the controller 40 determines whether or not the pump is in ON period. If the pump is in ON period, the processing proceeds to STEP 3 where the circulating pump 33 is turned on, and the processing proceeds to STEP 4. Contrary to this, when the pump is not in ON period (the pump is in OFF period), the processing branches to STEP 10 where the controller 40 turns off the circulating pump 33 and returns to STEP 2.

In STEP 4, the controller 40 determines whether or not the flow rate detected by the flow rate sensor 24 is equal to or more than a value of a reference flow rate+β. Here, the reference flow rate is set to, for example, 9 liters per minute based on an assumed value of a flow rate of the hot water that circulates through the water supply passage 11 when the circulating pump 33 is operated with the temperature responsive valve 61 being closed.

The value β is an assumed value of difference between the flow rate of the hot water circulating through the water supply passage 11 when the circulating pump 33 is operated with the temperature responsive valve 61 being opened and the flow rate of the hot water circulating through the water supply passage 11 when the circulating pump 33 is operated with the temperature responsive valve 61 being closed. For example, the value β is set to 3 liters per minute.

When the flow rate detected by the flow rate sensor 24 is equal to or more than a value of the reference flow rate+β (when the mixing faucet 50 is determined to be opened) in STEP 4, the processing branches to STEP 20 where the controller 40 stops the circulating pump 33 and executes hot-water supply operation.

When the flow rate detected by the flow rate sensor 24 becomes less than the operation flow rate (when it can be determined that the mixing faucet 50 is closed) in subsequent STEP 21, the processing returns to STEP 1, so that the controller 40 ends the hot-water supply operation and resumes the circulation heating operation.

When the flow rate detected by the flow rate sensor 24 is less than the value of the operation flow rate+β in STEP 4, the processing proceeds to STEP 5, where the controller 40 determines whether or not the circulating pump 33 continuously operates for predetermined time (set based on assumed time taken until the flow rate of the hot water circulating through the circulation circuit 80 is stabilized) or more. When the circulating pump 33 continuously operates for the predetermined time or more, the processing proceeds to STEP 6. When the circulating pump 33 does not continuously operate for the predetermined time or more, the processing returns to STEP 2.

In STEP 6, the controller 40 checks the flow rate detected by the flow rate sensor 24. Here, data of a value of a reference flow rate (an initial value is 9 liters per minute) is stored in the memory. In subsequent STEP 7, the controller 40 corrects (updates) the reference flow rate according to following expression (1) based on the detected flow rate checked in STEP 6, and the processing returns to STEP 2.

$$\{Qs-Qb(t)\}\times 0.1+Qb(t)\rightarrow Qb(t+1) \quad (1)$$

where Qs represents a detected flow rate in STEP 6, Qb(t) represents a present value of the reference flow rate stored in the memory, and Qb(t+1) represents a corrected reference flow rate.

The controller 40 stores in the memory the reference flow rate Qb(t+1) calculated by the expression (1) as a new reference flow rate, and updates the reference flow rate accordingly.

In the circulation circuit 80, the hot water fed from the heat exchanger 21 and the hot-water supply bypass passage 23 to the hot-water outlet passage 12 diverges to the first bypass passage 60 and to the second bypass passage 30. Accordingly, by decreasing the flow rate of the hot water flowing through the first bypass passage 60, the amount of the high-temperature hot water at a prescribed temperature or more, which flows from the first bypass passage 60 into the water outlet passage 13 until the temperature responsive valve 61 is closed, can be decreased.

This makes it possible to suppress the amount of the high-temperature hot water supplied from the water outlet passage 13 to the mixing faucet 50 so as to prevent excessive heat from being felt by a user when the user opens the mixing faucet 50.

Moreover, the flow rate of the hot water circulating through the first bypass passage 60 is increased and decreased depending on the flow rate of the hot water circulating through the second bypass passage 30. Accordingly, regulating the flow rate limited by the orifice 31 makes it possible to easily set the flow rate of the hot water circulating through the first bypass passage 60 while the circulating pump 33 is operated.

Since the flow rate sensor 24 is provided in a portion of the water supply passage 11 downstream from the connection point with the second bypass passage 30, the flow rate sensor 24 detects the total flow rate of the hot water circulating through the first bypass passage 60 and the hot water circulating through the second bypass passage 30. Accordingly, even when the flow rate of the hot water circulating through the first bypass passage 60 during the operation of the circulating pump 33 is decreased, the flow rate detected by the flow rate sensor 24 can be maintained to be equal to or more than the operation flow rate which is the operation condition of the burner 22.

In the present embodiment, the hot-water supply system 1 comprises the pump bypass passage 34 bypassing the circulating pump 33 and communicating with the water supply passage 11 and the pump check valve 35 as illustrated in FIG. 1. However, the effect of the present invention can also be acquired when the hot-water supply system 1 does not comprise the pump bypass passage 34 nor the pump check valve 35.

In the present embodiment, although the circulating pump 33 is provided in the water supply passage 11, the circulating pump 33 may be provided in a portion of the hot-water outlet passage 12 between the connection point with the hot-water supply bypass passage 23 and the connection point with the second bypass passage 30.

What is claimed is:

1. A hot-water supply system including a hot-water supplier having a burner and a heat exchanger heated by the burner to instantaneously supply hot water from the hot-water supplier to a mixing faucet, the system comprising:
    a water supply passage configured to make a water supply system communicate with an inlet of the heat exchanger;
    a hot-water outlet passage configured to make an outlet of the heat exchanger communicate with a hot-water side connection port of the mixing faucet;
    a water outlet passage connected to the water supply passage and communicating with a water side connection port of the mixing faucet;
    a first bypass passage configured to bypass the mixing faucet to make the hot-water outlet passage communicate with the water outlet passage;
    a temperature responsive valve provided in the first bypass passage and configured to be closed to block the first bypass passage when temperature of hot water inside the first bypass passage is equal to or more than a prescribed temperature;
    a second bypass passage configured to make a downstream point of the water supply passage communicate with an upstream point of the hot-water outlet passage, the downstream point being downstream from a branch point branching with the water outlet passage, the upstream point being upstream from a connection point with the first bypass passage;

a bypass check valve provided in the second bypass passage and configured to enable hot water to circulate from the hot-water outlet passage side to the water supply passage side while disabling the hot water from circulating from the water supply passage side to the hot-water outlet passage side;

a flow rate limiting orifice defined in the second bypass passage and configured to limit a flow rate of the hot water circulating through the second bypass passage, while allowing the hot water to flow through the second bypass passage;

a circulating pump provided in the water supply passage downstream from a connection point with the second bypass passage or in the hot-water outlet passage upstream from a connection point with the second bypass passage and configured to circulate the hot water inside a circulation circuit including at least the water supply passage, the heat exchanger, the hot-water outlet passage, the first bypass passage, the second bypass passage, the water outlet passage, and the water supply passage;

a flow rate detector configured to detect a flow rate of hot water flowing through the water supply passage downstream from the connection point with the second bypass passage; and a control unit configured to perform circulation heating operation for heating the hot water circulating through the circulation circuit by operating the circulating pump and also operating the burner when the flow rate detected by the flow rate detector is equal to or more than a specified flow rate while the circulating pump is operating, wherein the temperature responsive valve and the bypass check valve are configured to selectively allow simultaneous water flow through both the first and second bypass passages.

2. The hot-water supply system according to claim 1, further comprising:

a pump bypass passage configured to make a water inlet and a water outlet of the circulating pump communicate with each other; and a pump check valve provided in the pump bypass passage and configured to enable hot water to circulate from the water inlet side to the water outlet side of the pump while disabling the hot water from circulating from the water outlet side to the water inlet side of the pump, wherein when the flow rate detected by the flow rate detector from the water supplied to the water supply passage from the water supply system is equal to or more than the specified flow rate while the circulation heating operation is stopped and the circulating pump is stopped, the control unit performs hot-water supply operation including operating the burner to heat, by the hot-water supplier, water supplied to the water supply passage from the water supply system and supplying obtained hot water to the mixing faucet through the hot-water outlet passage.

3. The hot-water supply system according to claim 1, wherein the orifice defines a fixed opening within the second bypass passage.

4. The hot-water supply system according to claim 3, wherein the fixed opening of the orifice has an area different than that of an opening through other portions of the second bypass passage.

5. The hot-water supply system according to claim 4, wherein the flow rate limiting orifice is separate and spaced from the bypass check valve along the second bypass passage.

6. The hot-water supply system according to claim 3, wherein the flow rate limiting orifice is separate and spaced from the bypass check valve along the second bypass passage.

7. The hot-water supply system according to claim 1, wherein the flow rate limiting orifice is separate and spaced from the bypass check valve along the second bypass passage.

* * * * *